Sept. 12, 1933.    G. A. RICHTER    1,926,599
ARTIFICIAL LEATHER MANUFACTURE
Filed Jan. 18, 1929
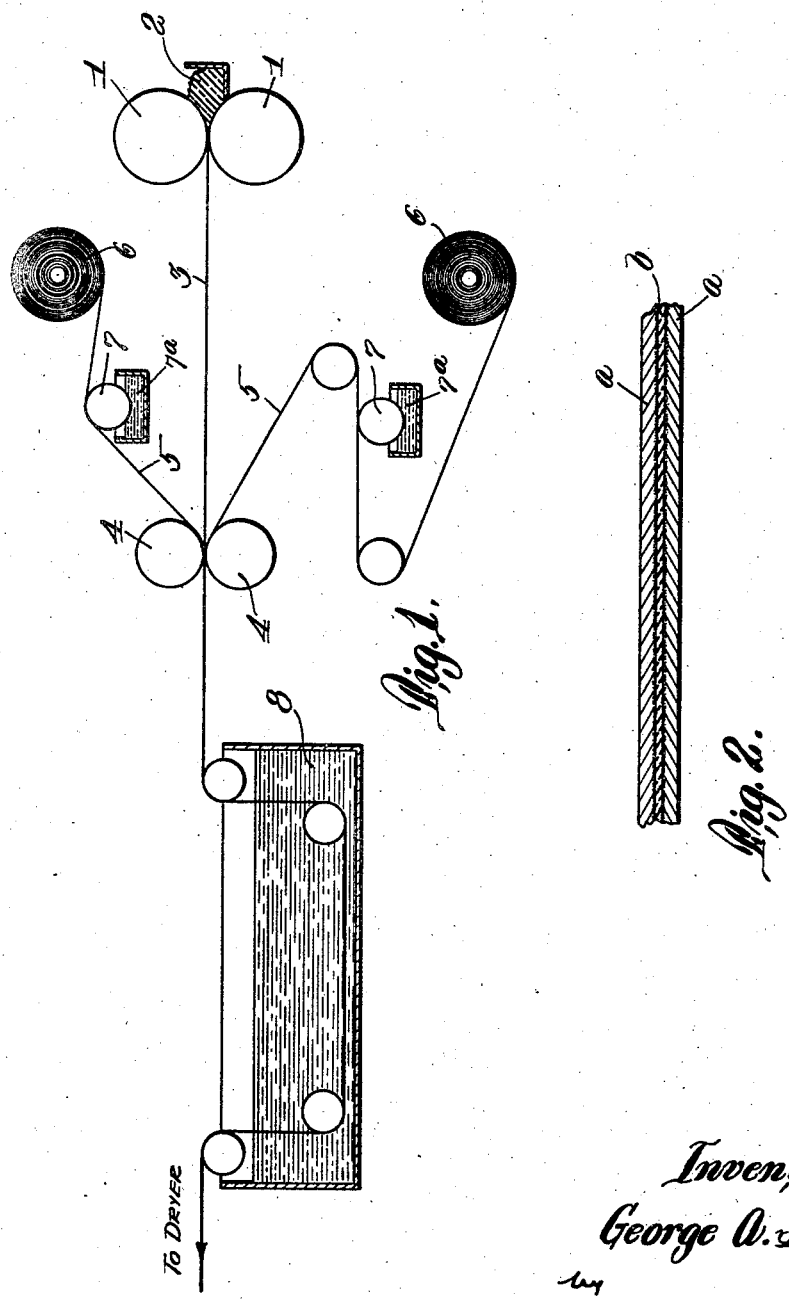
Inventor:
George A. Richter
by
Wright, Brown, Quinby & May
Att'ys.

Patented Sept. 12, 1933

1,926,599

UNITED STATES PATENT OFFICE 1,926,599

ARTIFICIAL LEATHER MANUFACTURE

George A. Richter, Berlin, N. H., assignor to Brown Company, Berlin, N. H., a corporation of Maine Application January 18, 1929. Serial No. 333,424

9 Claims. (Cl. 154—2)

This invention relates to the manufacture of artificial leather using cellulose fiber such as cotton or wood pulp and rubber as raw materials.

In the manufacture of artificial leather, it is sometimes the practice to felt cellulose fibers such as cotton or wood pulp into a porous web, then to impregnate the web with rubber in the form of an aqueous dispersion or a so-called rubber solution, the liquid vehicle of which serves to carry the rubber particles into and through the pores of the web, and then to dry the impregnated web. It is, however, difficult to completely fill the pores of the web by this method, as a removal of the liquid vehicle from the web results in more or less porosity in the final product. This is particularly true when a dilute rubber dispersion or solution is employed to effect rapid and complete impregnation, as in such case the pores of the web are filled with more liquid than rubber, and considerable porosity is restored upon the removal of the liquid. The porosity of the final product will, of course, vary, depending upon the porosity of the original web and the concentration of rubber in the rubber dispersion or solution, but when the web is made in a loosely felted, more or less fluffy condition so as to absorb considerable rubber, say, 100% or more, based on the weight of fiber, and to acquire many of the desirable characteristics of natural leather, the porosity of the product is sufficiently pronounced so that it is not perfectly waterproof.

In accordance with the present invention, a perfectly waterproof product is made by uniting or bonding one or more porous webs of felted fiber before or after impregnation, with a sheet of rubber which serves as a barrier against the penetration of water. The resulting product is eminently suitable for use where complete waterproofness is desired, e. g., for automobile tops or some types of boots and shoes. When a loosely felted, more or less fluffy web is used as a raw material, a further advantage may be gained by uniting the web with the sheet of rubber before impregnation, as in such case the rubber sheet serves to reinforce the weak web, reducing possibility of breakage when it is passed through the bath of rubber dispersion or solution as a continuous sheet. Preferably, the rubber sheet is bonded between two webs of felted fiber, so that the resulting product may appear and feel like leather on the outside and at the same time be completely impenetrable by water.

With these and other features in view, the invention may be best understood from the following more detailed description thereof when considered with the accompanying drawing, wherein Figure 1 illustrates more or less diagrammatically and conventionally a method of making an artificial leather product having an inner rubber ply.

Figure 2 represents a section through the resulting product.

Referring to Figure 1 of the drawing, 1 represents a pair of calender rolls into the nip of which rubber or rubber compound is fed from a bank 2 on one side of the rolls, a continuous sheet of rubber 3 of the desired caliper emerging from the nip on the other side of the rolls. The clearance between the calender rolls may be adjusted to produce a rubber ply of predetermined, uniform thickness, this uniformity being indicated in Figure 2. The rubber sheet may be progressively fed into the nip of a pair of rolls 4 along with and between two porous webs of felted fiber 5 which may be progressively unwound from reels 6. The fiber webs are united to the rubber by the pressure of the rolls, there being sufficient inherent tackiness in the rubber to result in a bonding of the rubber to the fiber under pressure, or preferably a suitable adhesive such as a rubber solution is applied to the inner faces of the webs 5, before being united face to face with the rubber sheet, so as to ensure a bonding with the rubber sheet without the application of pressures which would tend to break the webs, even when they are comparatively weak. As shown, application of adhesive is accomplished by bringing the inner faces of the webs 5 into contact with rolls 7 rotated partially submerged in baths 7a of the adhesive, before they are brought together with the rubber sheet. The multi-ply sheet coming from the rolls 4 may be passed into a bath of dispersed rubber such as latex or a rubber solution such as rubber benzol solution, to effect a complete impregnation of the fibrous webs, whereupon the sheet may be removed from the bath and dried. If desired, the bath may contain suitable vulcanizing agents and accelerators of vulcanization, so that vulcanization of the multi-ply sheet may be effected after drying, or during drying when effected at elevated temperature. During such drying at elevated temperature, vulcanization of the inner ply of rubber may also be effected when it has been made from a rubber compound containing sulphur, and, if desired, accelerators of vulcanization. Or the multi-ply sheet may be vulcanized after drying, by subjecting it to the action of a solution or vapors of sulphur chloride. Either or both surfaces of the product may be embossed or otherwise surface-finished to resemble leather. The outer plies *a* are characterized by a leathery feel and have many of the desirable characteristics of leather, particularly when the webs of fiber used as a raw material are made in a loosely felted, more or less fluffy condition on machinery of the paper-making type and are uniformly impregnated with 100% or more rubber, based on the weight of fiber. The inner ply *b* of rubber serves as a barrier against the penetration of water through the sheet, even when either or both the outer plies are so porous that water may soak through. By relying upon a pre-formed sheet of rubber of predetermined, uniform thickness as the barrier against penetration by water, the outer plies may be kept porous to preserve their leather-like quality, as there is little, if any, flow of the solid rubber into the outer plies; whereas were rubber in liquid form, such as rubber cement, used in amount sufficient to ensure a waterproof barrier or layer, the rubber in such form would tend, particularly under pressure, to enter into and obstruct the pores of the outer plies. In other words, rather than being maintained as a sharply defined phase or layer to resist penetration by water, much of the liquid rubber would become distributed through the pores of the outer plies.

When aqueous dispersions of rubber are employed to effect the impregnation of the webs of fiber, fillers such as lamp black and zinc oxide, vulcanizing agents such as colloidal sulphur, accelerators of vulcanization, and stabilizing agents may be added to the dispersion to impart the desired characteristics to the final product. Or the rubber may be compounded with such materials prior to its dispersion in water by approved modern methods. The use of aqueous dispersions of rubber avoids fire hazard and the loss of valuable organic solvent incident to the use of so-called rubber solutions or rubber cements.

Owing to the lack of a generic term for such materials as rubber latex, artificial dispersions of crude or reclaimed rubber, and rubber solutions, by the expression "liquid vehicle containing rubber," as used in the appended claims I mean any of such materials.

Having thus described certain products and their mode of manufacture in accordance with the present invention, it should be evident to those skilled in the art that various changes and modifications might be made therein without departing from the spirit or scope of invention as defined in the appended claims.

What I claim is:

1. A method which comprises uniting a porous web of unwoven but felted fibers with a pre-formed sheet of rubber, impregnating with a liquid vehicle containing rubber, and removing the liquid vehicle.

2. A method which comprises bonding a pre-formed sheet of rubber between porous webs of unwoven but felted fiber, impregnating with a liquid vehicle containing rubber, and removing the liquid vehicle.

3. A method which comprises calendering rubber into a continuous sheet, progressively bonding the sheet with a porous web of unwoven but felted fiber, impregnating with a liquid vehicle containing rubber, and removing the liquid vehicle.

4. A method which comprises calendering rubber into a continuous sheet, progressively passing the sheet between porous webs of unwoven but felted fiber and uniting the same, impregnating with a liquid vehicle containing rubber, and removing the liquid vehicle.

5. A method which comprises uniting a porous web of unwoven but felted fibers with a pre-formed sheet of rubber, impregnating with an aqueous dispersion of rubber, and drying.

6. A method which comprises uniting a porous web of unwoven but felted fibers with a pre-formed sheet of rubber compound containing sulphur, impregnating with an aqueous dispersion of rubber containing sulphur, and drying at elevated temperature to effect vulcanization of the rubber.

7. Multi-ply sheet material comprising a rubber-impregnated ply of unwoven but felted fibers possessing porosity and facially united with a pre-formed ply of rubber constituting a perfectly waterproof backing for said impregnated fiber ply.

8. Multi-ply sheet material comprising an inner, pre-formed ply of rubber facially united with rubber-impregnated outer plies of unwoven but felted fiber possessing porosity, said inner ply serving as a perfectly waterproof barrier between the outer plies.

9. Covering consisting of an exposed layer of felt impregnated throughout with rubber, and a pre-formed backing layer of rubber, said layers being vulcanized together.

GEORGE A. RICHTER.